United States Patent [19]
Choi

[11] Patent Number: 5,178,572
[45] Date of Patent: Jan. 12, 1993

[54] ELECTRON GUN SEALING APPARATUS

[75] Inventor: Dae-ok Choi, Suwon, Rep. of Korea

[73] Assignee: Samsung Electron Devices Co., Ltd., Kyunggi, Rep. of Korea

[21] Appl. No.: 785,806

[22] Filed: Oct. 31, 1991

[30] Foreign Application Priority Data

Nov. 1, 1990 [KR] Rep. of Korea .................... 90-17701

[51] Int. Cl.⁵ .............................................. H01J 9/26
[52] U.S. Cl. .......................................... 445/67; 445/70
[58] Field of Search ...................... 156/82, 497; 65/34; 445/66, 67, 34, 70

[56]          References Cited
          U.S. PATENT DOCUMENTS 4,559,019 12/1985 Fendley et al. ..................... 445/67
4,772,239 9/1986 Yasuda ................................ 445/67

*Primary Examiner*—Bernard Nozick
*Attorney, Agent, or Firm*—Leydig, Voit & Mayer

[57]          ABSTRACT

An electron gun sealing apparatus comprises a bulb supporting means for supporting a bulb, a first up/down means for raising and lowering an electron gun, which is vertically positioned below the bulb, a heating means arranged around the neck of the bulb to heat the neck and the stem of an electron gun, a second up/down means for raising and lowering the heating means to a certain height in relation to the neck, and a revolving means for rotating the heating means with respect to the electron gun supporter. Since the sealing by the sealing apparatus is performed by rotating the heating means, the bulb is free from centrifugal force, preventing displaced sealing of the neck. Also, thinning and cracking at the seal is prevented by an accurate position control and a sealing flame adjustment. Further, this automatically performed sealing operation simplifies the sealing, reduces labor, and improves productivity.

7 Claims, 11 Drawing Sheets

ELECTRON GUN SEALING APPARATUS

BACKGROUND OF THE INVENTION

The present invention relates to a sealing apparatus, and particularly to an electron gun sealing apparatus for fixedly securing an electron gun to the neck of a bulb for a cathode ray tube.

Generally, an electron gun sealing apparatus serves to form a vacuum envelope, in the following manner: first, an electron gun is inserted into the neck of an unsealed bulb for a cathode ray tube then, the stem of the electron gun is welded to the neck of the bulb by heating the outer surface of the neck with a burner. The construction of such a sealing apparatus for welding the electron gun's stem and the bulb's neck is illustrated in FIG. 1 and will be described below.

A plurality of supporting frames 3 mounting bulbs 100 for cathode ray tubes are rotatably installed around the edge of a turntable 2. An electron gun support rod 4 is provided for inserting an electron gun 110 into a neck 101 of a bulb 100 mounted on each supporting frame 3. A pair of burners 5 supported by supporters 5a are installed around the turntable 2, and are spaced apart from each other. The supporting frame 3 and the electron gun support rod 4 are installed to be rotated at a predetermined revolution on the turntable 2. The electron gun support rod 4 is elevated and retracted by a raising and lowering means (not shown).

In order to seal the electron gun 110 in the neck 101 of the cathode ray tube using the conventional electron gun sealing apparatus constructed as above, first, the bulb 100 for the cathode ray tube is mounted to the supporting frame 3 which is installed on turntable 2. At the same time, the electron gun 110 is held by the support rod 4. Under these circumstances, the electron gun support rod 4 is elevated by the unseen raising and lowering means, thereby inserting the electron gun 110 into the neck 101 of bulb 100. While the supporting frame 3 and the electron gun support rod 4 are both rotated, the burners 5 installed around turntable 2 rotate through a predetermined angle and heat the neck 101 by applying a pilot flame and a main flame in a regular sequence. Therefore, the stem of the electron gun 110 and the neck 101 of the bulb 100 are fixedly welded to each other, completing the sealing process.

However, the above-described conventional electron gun sealing apparatus requires a sizable facility for the overall installation, resulting not only in occupying a large area, but also incurring high maintenance expenses. A particular disadvantage of the above sealing operation is that, since the turntable 2 is turned by predetermined angles along with rotating the bulb 100 and the electron gun support rod 4, the rotation of the turntable 2 forces the bulb mounted to the supporting frame 3 to be under the influence of centrifugal force, repeatedly displacing the bulb, which in turn widens the range of sealing errors. Moreover, these conditions lead to variations in the seal and therefore inconsistent quality, thereby increasing the quantity of inferior products.

SUMMARY OF THE INVENTION

The present invention is intended to solve the above described problems of the conventional apparatus.

Accordingly, it is an object of the present invention to provide an electron gun sealing apparatus, by which a bulb is not displaced from an electron gun supporter by being free from centrifugal force, so that misplaced sealing can be prevented. Furthermore, the causes of thinned and cracked necks wherein an electron gun is sealed, are basically solved, improving product reliability and productivity.

To achieve the object, there is provided an electron gun sealing apparatus for sealing an electron gun in the neck of a bulb for a cathode ray tube comprising:

a bulb supporting means placed above a frame including a neck position adjuster, for supporting the bulb and adjusting and fixing the position of the bulb neck;

a first up/down means for raising and lowering an electron gun supporter, provided vertically below the neck position adjuster;

a heating means for heating the bulb neck, arranged to surround the electron gun supporter;

a second up/down means for raising and lowering the heating means to a certain height in relation to the electron gun supporter and a revolving means for rotating the heating means around the electron gun supporter.

DETAILED DESCRIPTION OF THE INVENTION

The preferred embodiment of the present invention will now be described in detail with reference to the accompanying drawings.

Figure 1:
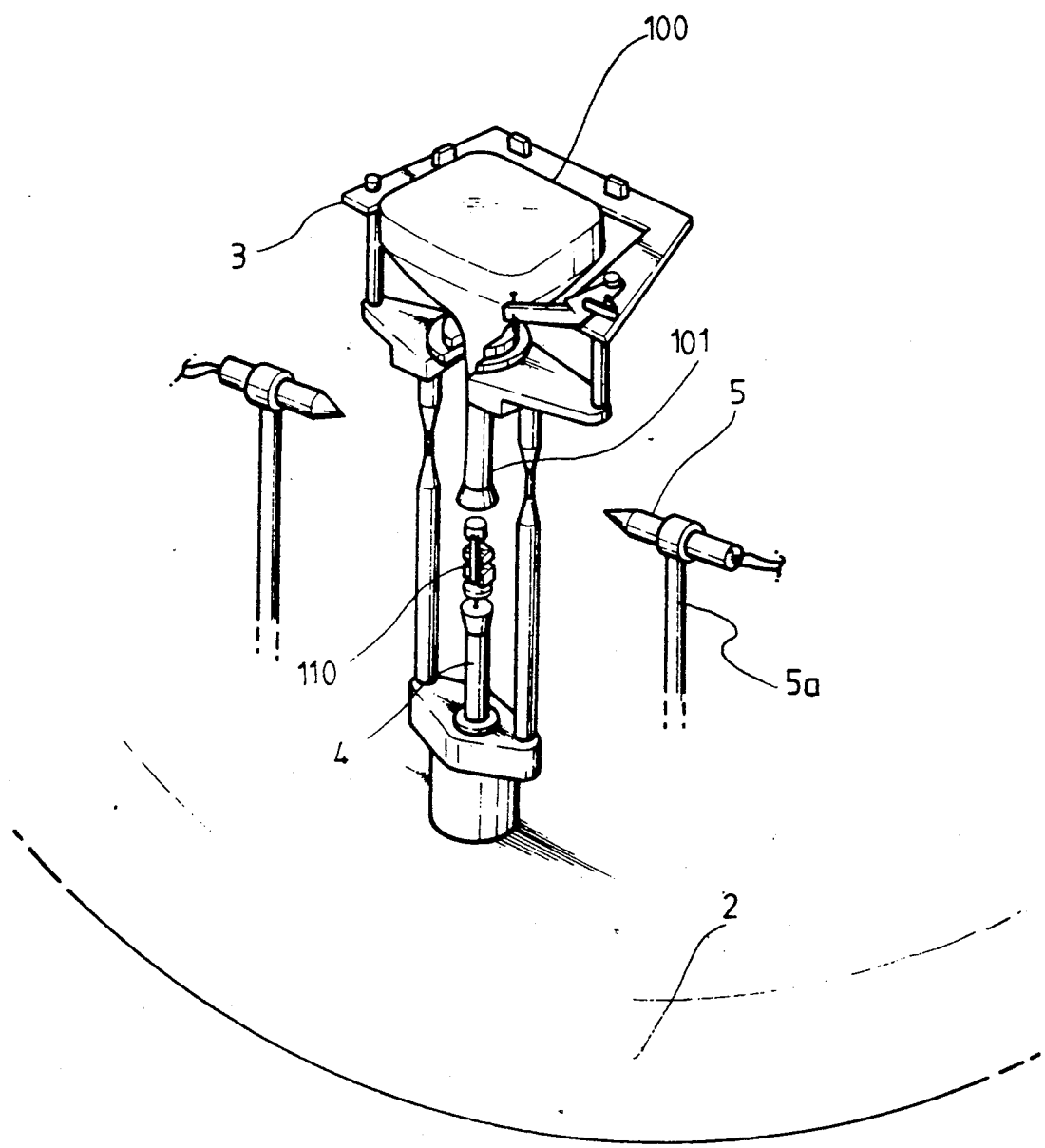
FIG. 1 is a perspective view of a conventional electron gun sealing apparatus.
Figure 2:
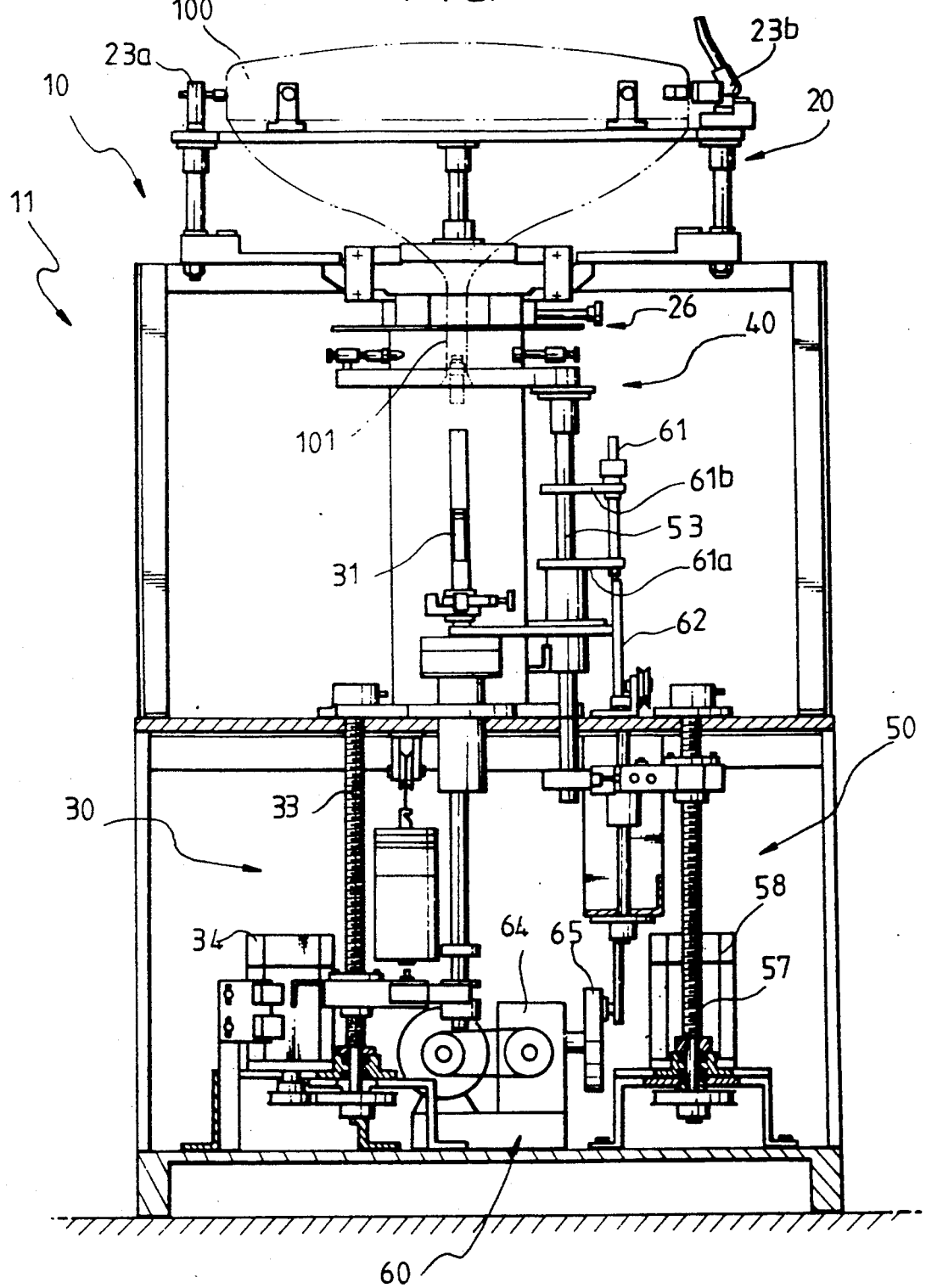
FIG. 2 is a vertical section view of an electron gun sealing apparatus according to the present invention.

FIG. 2 illustrates an electron gun sealing apparatus according to the present invention. The operation of the sealing apparatus is carried out by a bulb supporting means 20 for supporting a bulb 100, which is installed in the upper portion of a frame 11; a first up/down means 30 for pushing up and lowering an electron gun, which is installed in the lower portion of frame 11 and is provided vertically below the bulb 100 seated on the bulb supporting means 20; a heating means 40 for heating a neck 101 and the stem of the electron gun 110, which is positioned around the neck 101; a second up/down means 50 for raising and lowering the heating means 40 at a predetermined height in relation to the neck 101, which is installed in the lower portion of frame 11; and a revolving means 60 for rotating the heating means 40 with respect to the electron gun supporter 31.

Figure 3:
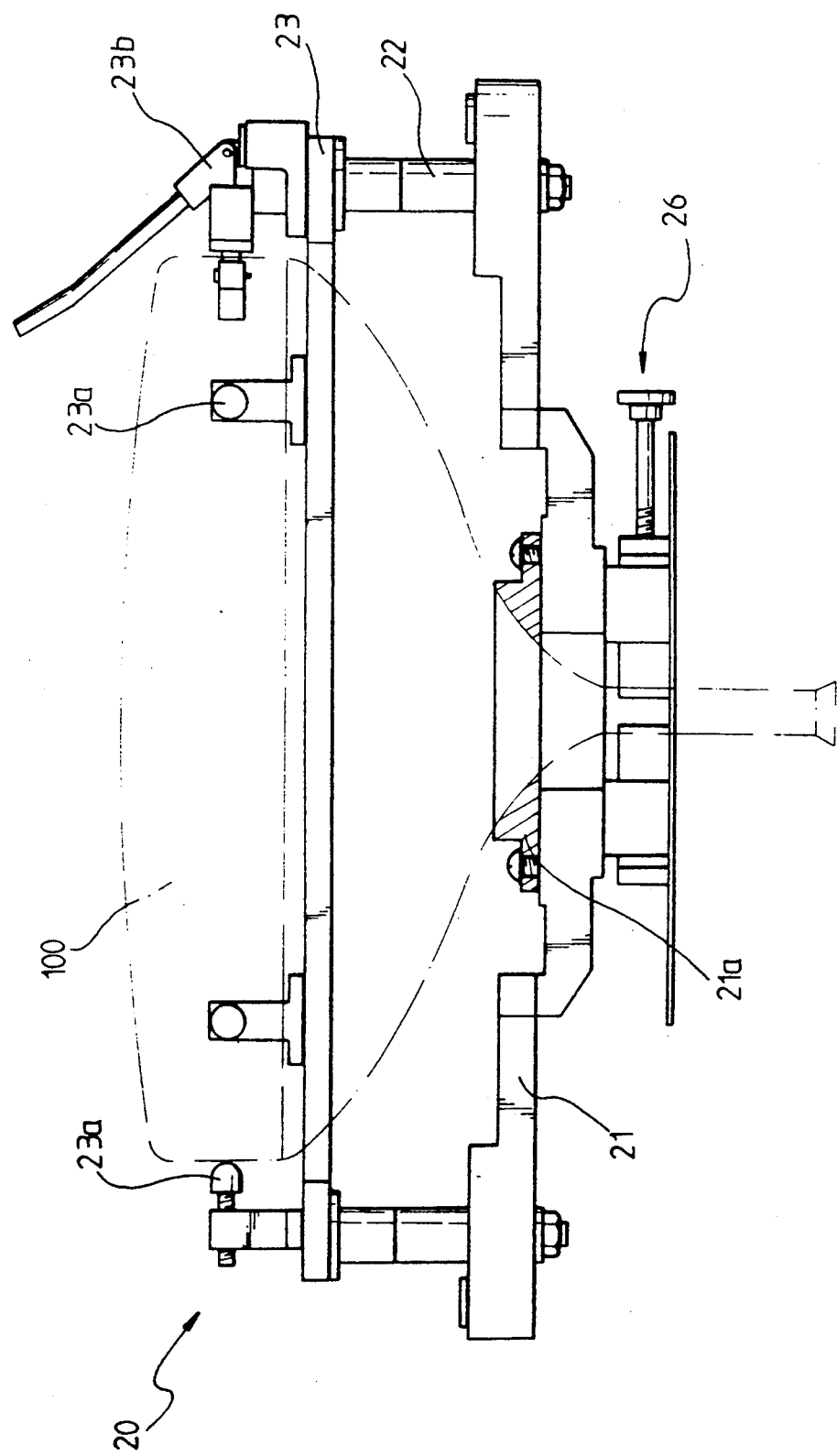
FIG. 3 is a partially cutaway side view of the bulb supporting means shown in FIG. 2.
Figure 4:
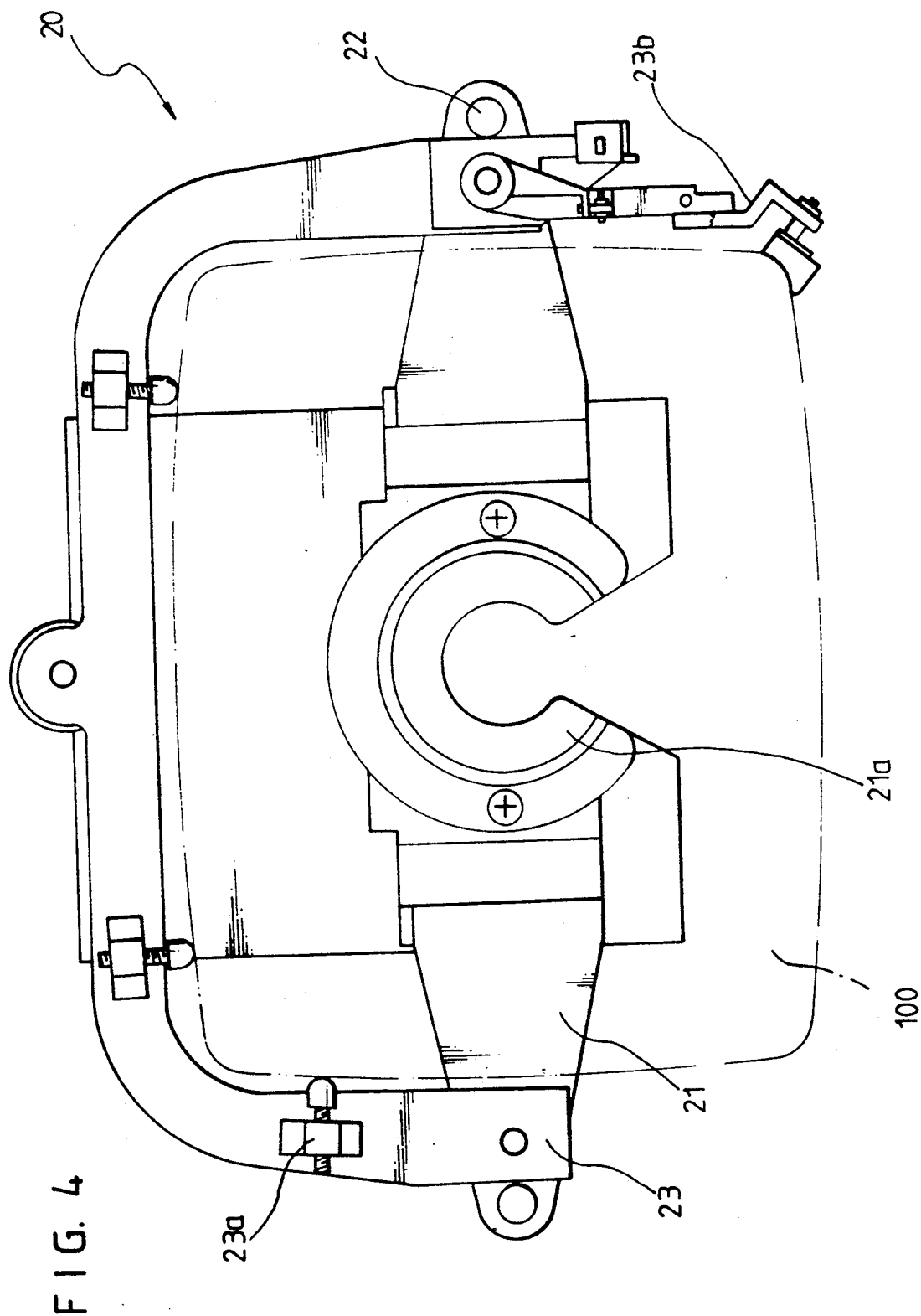
FIG. 4 is a plan view of the bulb supporting means shown in FIG. 2.

The bulb supporting means 20 is installed on top of the upper portion of frame 11 to support bulb 100. As illustrated in FIGS. 3 and 4, the funnel of bulb 100 is seated on a holder 21a provided to a lower pedestal 21 which is fixed to the frame 11. An upper pedestal 23 surrounding the funnel of the bulb 100 is installed above the lower pedestal 21 and supported by posts 22 which are fixed to the lower pedestal 21. A plurality of stops 23a and a clamp 23b are provided to the upper pedestal to be in contact with the perimetric surface of the funnel of bulb 100, and designed to define the proper position of bulb 100. A neck position adjuster 26 is mounted to the holder 21a beneath lower pedestal 21, for adjusting the position of the neck 101.

Figure 5:
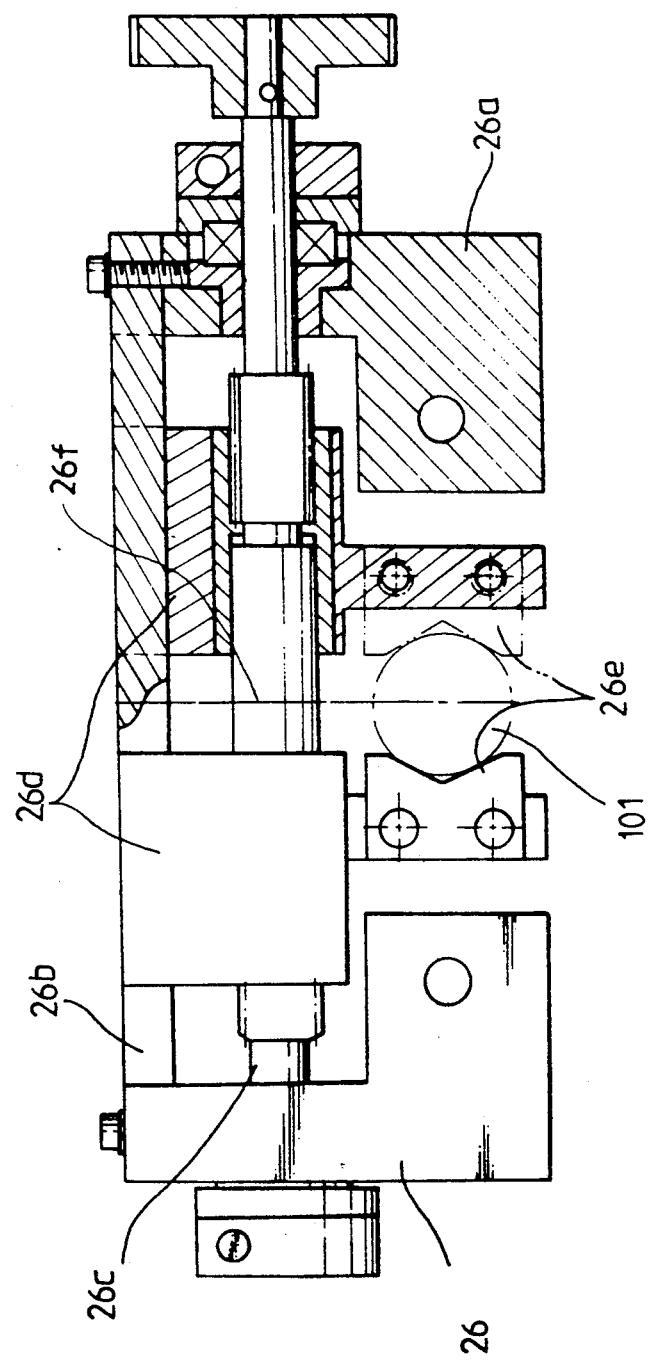
FIG. 5 is a partially cutaway plan view of the neck position controller of the electron gun support rod shown in FIG. 2.

As illustrated in FIG. 5, the neck position adjuster 26 comprises: a guide rail 26b installed between a pair of holding blocks 26a spaced apart from each other by a predetermined distance, and a pair of feed blocks 26d having extensions, each of which support a jaw 26e. Each feed block 26d and jaw 26e combination is guided back and forth on guide rail 26b to be translated diametrically along a line of symmetry 26f by being screw-coupled with a lead screw 26c which is rotatably installed to the holding blocks 26a.

Figure 6:
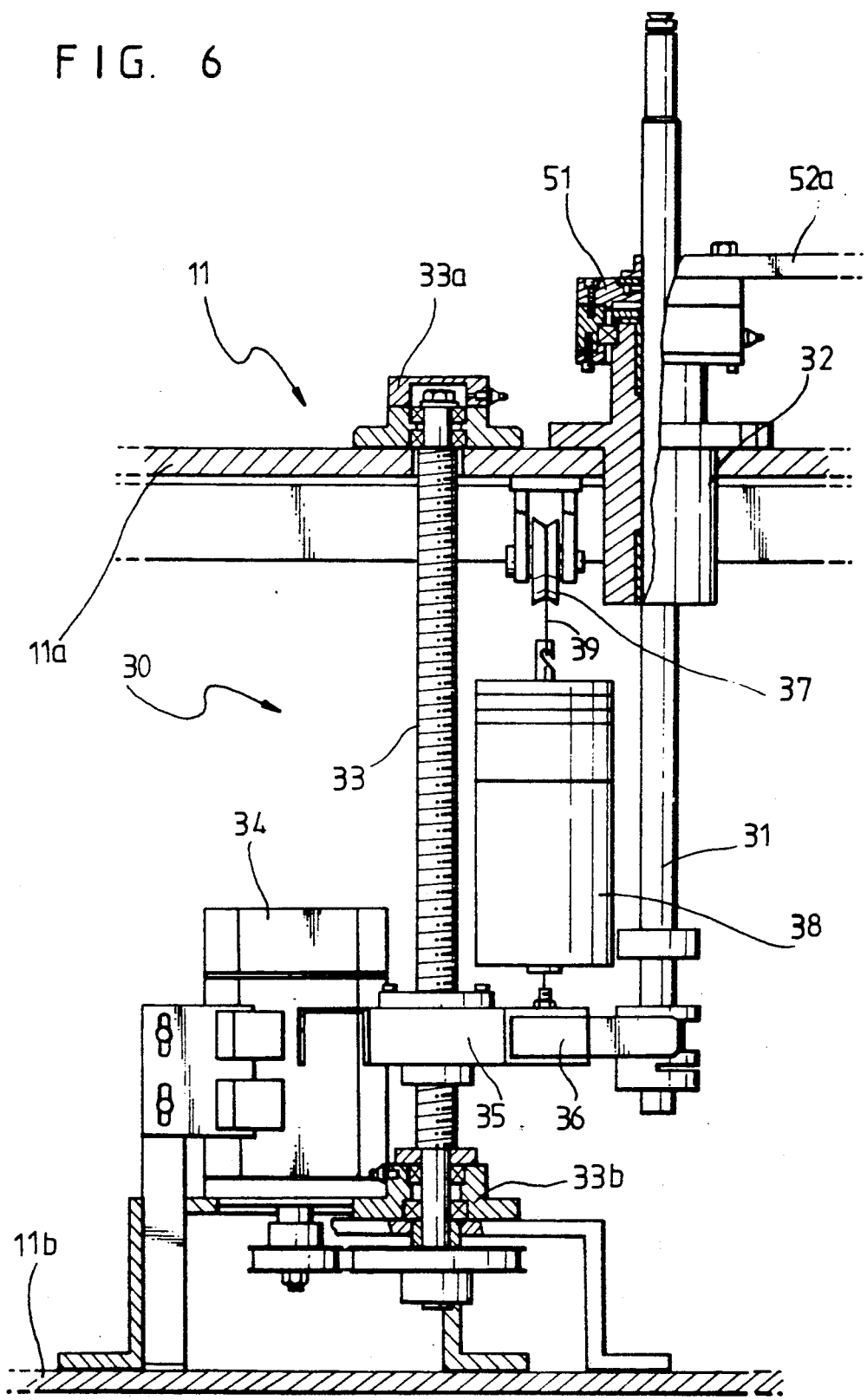
FIG. 6 is a partially cutaway side view of the first up/down means shown in FIG. 2.

The first up/down means 30 installed in the lower portion of the frame 11 is formed for the purpose of raising and lowering the electron gun supporter 31 whose axis is the same as the neck 101 of bulb 100 mounted on the bulb supporting means 20 (refer to FIGS. 2, 3, and 4). As illustrated in FIG. 6, the electron gun supporter 31 is free to slide up and down along a first slide-fixing cylinder 32 which is fixed to the upper plate 11a of frame 11. A first ball screw 33 is supported by pillow blocks 33a and 33b between an upper plate 11a and a base plate 11b of frame 11, adjacently to the electron gun supporter 31. The first ball screw 33 rotated by a first servo-motor 34 is installed to be parallel with the electron gun supporter 31. A first feed member 35 is screw-coupled to the first ball screw 33, and is mechanically coupled to the electron gun supporter 31 by a coupler 36. Here, the electron gun supporter 31 is rotatably fixed to the coupler 36. Also, a suspension pulley 37 is installed to the rear surface of the upper plate 11a of the frame, one side of which a cord 39 is attached to the coupler 36, and other side of which hangs a counter-balance weight 38 linked to the coupler 36 through the pulley, thus easing the upward and downward movement of the electron gun supporter 31 performed by the first ball screw 33 driven by the first servo-motor 34. In addition, an unillustrated minute adjusting means, which can rotate the electron gun supporter 31 in relation to the first slide-fixing cylinder 32, is installed to the electron gun supporter 31.

Figure 7:
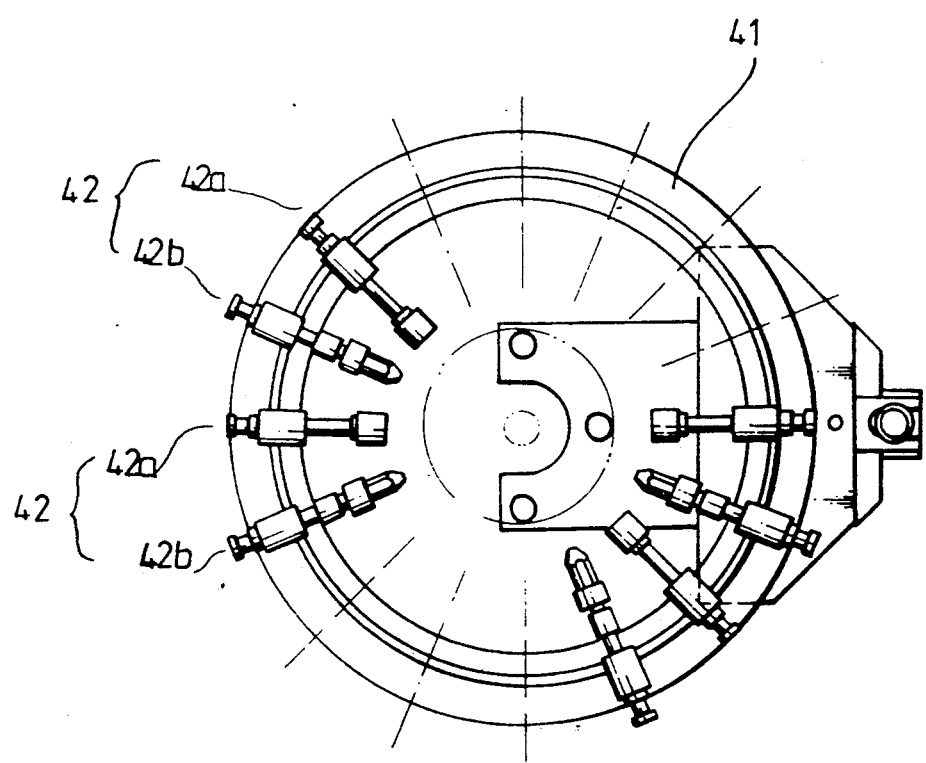
FIG. 7 is a plan view of the heating means shown in FIG. 2.
Figure 8:
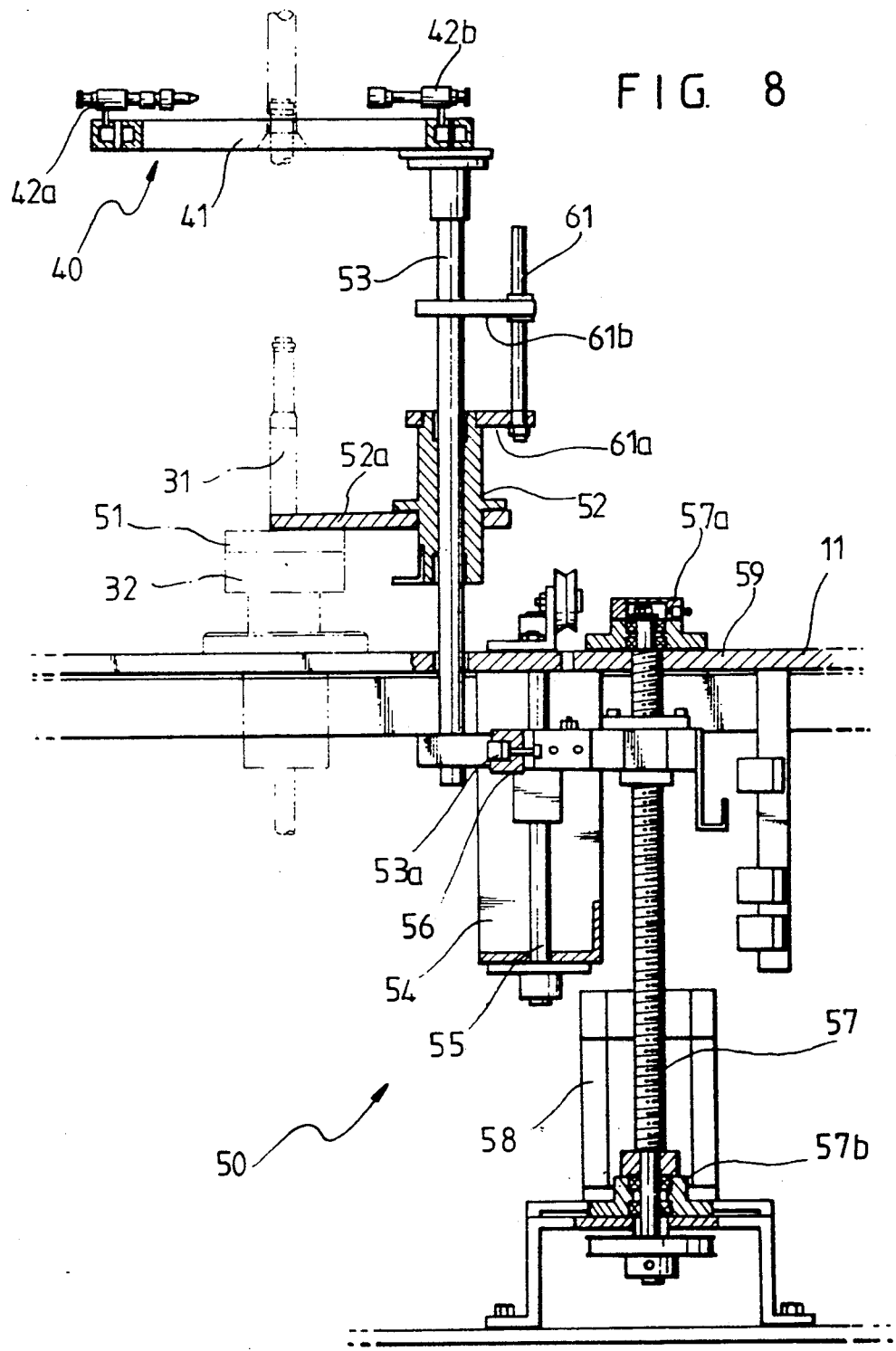
FIG. 8 is a partially cutaway side view of a combined heating means and second up/down means shown in FIG. 2.

The heating means 40 surrounds the neck 101 of the bulb 100 (driven upward or downward by the second up/down means and explained later) and is rotated by the revolving means 60 centering around the neck 101. As illustrated in FIGS. 7 and 8, the heating means 40 includes a plurality of burners 42 facing the neck 101 and being installed on an annular stand 41. It is preferable that the burners 42 be alternately installed in pairs consisting of welding burner 42a with one nozzle and a preheating burner 42b with multiple nozzles, and be mounted on the upper surface of the annular stand 41.

Figure 9:
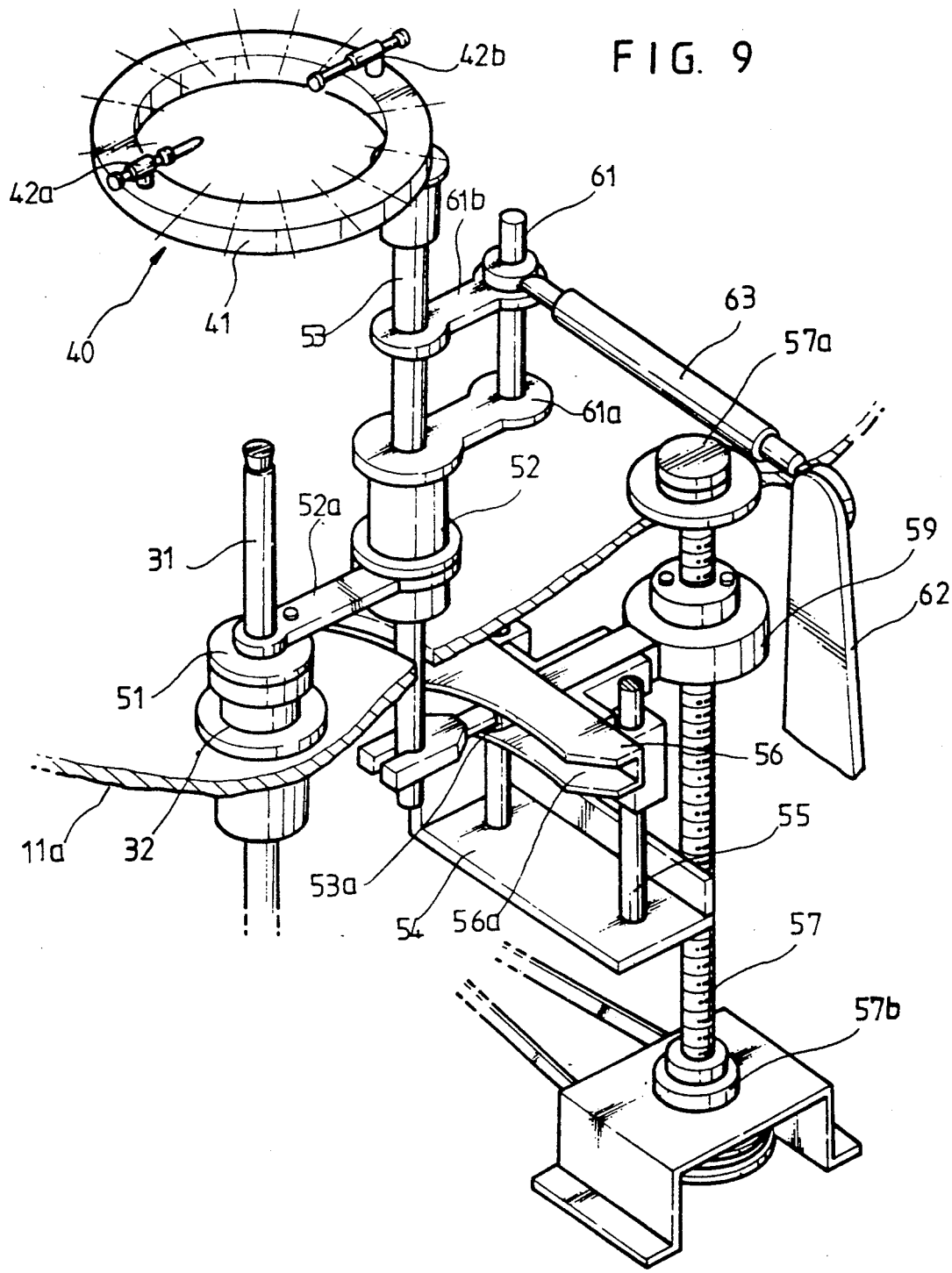
FIG. 9 is a partially enlarged perspective view of the combined heating means and second up/down means shown in FIG. 8.

The second up/down means 50 is installed to the lower portion of the frame 11, and is used for raising and lowering the heating means 40 to a certain height in relation to the neck 101 of bulb 100. As illustrated in FIGS. 8 and 9, a burner support rod 53 is installed to a second slide-fixing cylinder 52 which is connected to a rotating member 51 rotatably installed to the upper portion of the first slide-fixing cylinder 32 by a swing arm 52a. The burner support rod 53 supports the annular stand 41 of the heating means and is free to slide up and down along the direction of the axis. A guide roller 53a projects at right angles from one end of the burner support rod 53 by predetermined length or height. The guide roller 53a is fitted into a guiding groove 56a of a guide block 56 guided by a guide rod 55 which is fixed to a bracket 54 fixed to the lower portion of the upper plate 11a of the frame 11. Here, the guide rod 55 is parallel to the burner support rod 53. The guiding groove 56a of the guide block 56 is formed to have a predetermined curvature centering around the electron gun supporter 31. In the upper plate 11a and base plate 11b, a second ball screw 57 which is supported by pillow block 57a and 57b, and rotated by a second servo-motor 58 is installed parallel to the guide rod 55. A second feed member 59 screw-coupled to the second ball screw 57 is pulled up and down in accordance with the rotational movement of the second ball screw 57, and is connected to the guide block 56, thereby making a pivot connection.

Figure 10:
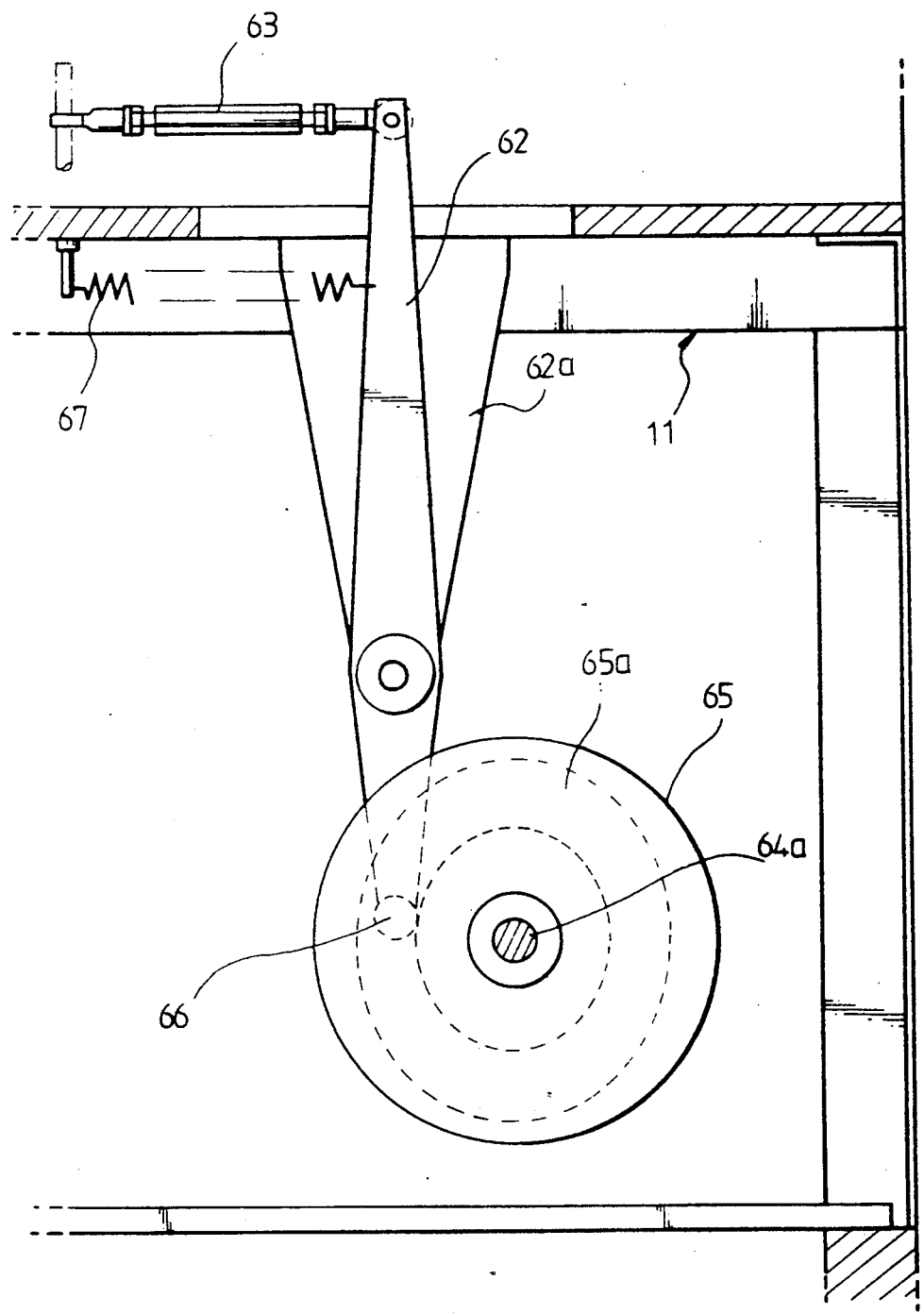
FIG. 10 is a partially enlarged side view of a revolving means shown in FIG. 2.
Figure 11:
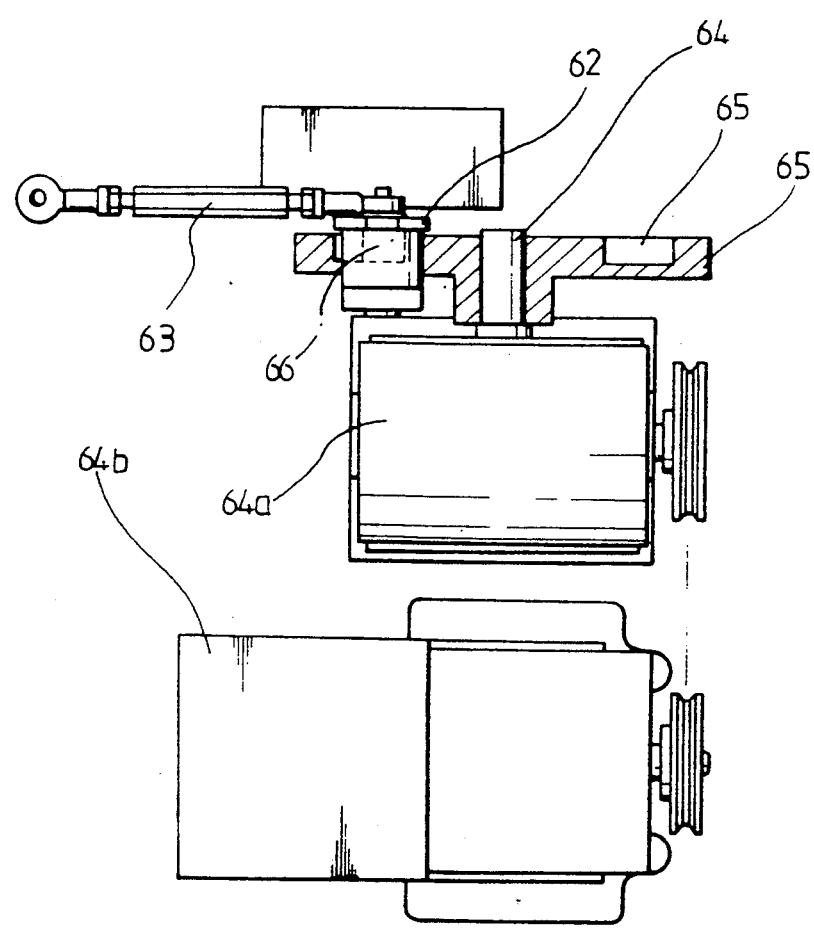
FIG. 11 is a plan view of the revolving means shown in FIG. 2.

The revolving means 60 rotates the burner support rod 53 by predetermined angles with respect to the electron gun supporter 31, so that the annular stand 41 of the heating means 40 is rotated by predetermined angles centering around the neck 101. As illustrated in FIGS. 9 through 11, a fixing pole 61 supported by the coupler is parallel to the burner support rod 53, and is spaced apart from the burner support rod 53 by a predetermined distance. For constituting pivot connection, the fixing pole 61 is also coupled to the upper end of a lever 62 operated to be driven up and down which is joined to a bracket 62a at the rear surface of the upper plate 11a of the frame 11, by means of a turnbuckle 63. The lower end of the lever 62 is joined to a cam 65 formed to a drive set 64 which is composed of a rotary shaft 64a, a gearbox 64b, and a motor 64c. Here, an elliptical channel 65a centered on the rotary shaft 64a is recessed into on side of the cam 65, and a roller bearing 66 projects by predetermined length or height from the lower end of the lever, so that the roller bearing 66 is inserted into the elliptical channel 65a of the cam 65. By this insertion, the lower end of the lever 62 is joined to the cam 65. The upper end of the lever 62 is connected to a spring 67 whose opposite end is fixed to the frame 11, securing contact between the roller bearing 66 formed at the lower end of the lever 62 and elliptical channel 65a.

The operation according to the present invention will be illustrated with reference to the accompanying drawings.

In order to seal the electron gun to the neck 101 of the bulb 100 for the cathode ray tube by using the electron gun sealing apparatus according to the present invention, first, the funnel of the bulb 100 is seated in the holder 21a of the bulb supporting means 20 shown in FIG. 3. The perimetric surface of the funnel of the bulb 100 is in close contact with the stops 23a of the upper pedestal 23. Then, the bulb 100 is clamped to the lower and upper pedestals 21 and 23 by the clamp 23b. As shown in FIG. 5, in order to place the centers of the neck 101 (mounted to the bulb supporting means 20)

and the electron gun supporter 31 on the same axis, the lead screw 26c of the neck position adjuster 26 is rotated, so that each feed block 26d travels along the guide rail 20b opposing directions. Therefore, both jaws 26e grip the neck 101. Thereafter, the electron gun to be sealed is inserted and is supported by the electron gun supporter 31, at the same axis as the electron gun supporter 31. After completing the insertion of the electron gun 110 to the electron gun supporter 31, the getter container of the electron gun 110 is inserted in the neck 101. It is under these circumstances that the electron gun supporter 31 is lifted to position the stem of the electron gun at a predetermined sealing place. Here, the electron gun supporter 31 is pulled up by the first ball screw 33 driven so as to rotate by the first servo-motor 34, shown in FIG. 6. By doing so, the first feed member 35 screw-coupled to the first ball screw 33 is lifted in accordance with the rotational movement of the first ball screw 33. Since the first feed member 35 is also mechanically coupled to the lower end of electron gun supporter 31, the electron gun supporter slides up. When the predetermined sealing position of the electron gun and the neck 101 supported by the electron gun supporter 31 do not match within a certain angle, the electron gun supporter 31 is rotated by a predetermined angle by the unshown minute adjusting means to correct the sealing position. When the electron gun is fully inserted into the neck 101, the revolving means is engaged to rotate the heating means 40 around the center of the neck 101. As for heating means 40 shown in FIGS. 9 through 11, the cam 65 formed to the drive set 64 is rotated, thereby reciprocating the lever 62 upward and downward pivoting on a hinge shaft. Thus, the fixing pole 61 of the burner support rod 53 coupled to the upper end of the lever 62 by the turnbuckle 63 is rotated. At this time, the second slide-fixing cylinder 52 of the burner support rod 53 is connected to the first slide-fixing cylinder 32 supporting the electron gun supporter 31, by the rotating member 51 and the swing arm 52a. Also, the guide roller 53a provided to the lower end of the burner support rod 53 is guided along the guiding groove 56a of the guide block 56 having a predetermined curvature. As a result, the burner support rod 53 is rotated centering around the electron gun supporter 31 which rotates the heating means 40 around the center of the neck 101.

When the heating means 40 is rotated centering around the center of the neck 101, the preheating burners 42b installed to the annular stand 41 of the heating means 40 are fired to heat the sealing position of the neck 101 by a weak flame. Under this condition, the welding burners 42a installed to the annular stand 41 are ignited to weld the stem and the neck 101 of the electron gun by heating the neck 101, varying the flames by steps. During the heating of the neck 101 with the welding burners 42a, the welding burners 42a are raised and lowered by using the second up/down means 50. That is, as shown in FIG. 8, the second servo-motor 58 of the second up/down means 50 is rotated to turn the second ball screw 57 forward or reversely, so that the second feed member 59 screw-coupled to the second ball screw 57 is running up and down, which in turn raises and lowers the guide block 56 along the guide pole 55. At this time, since the guide roller 53a of the burner support rod 53 is inserted into the guide groove 56a of the guide block 56, the burner support rod 53 is raised and lowered to lift the heating means 40 up and down.

When the electron gun is completely sealed to the neck 101 of bulb 100 as described above, the welding burners 42a are extinguished. Successively, the preheating burners 42b of the heating means are fired again to treat the sealed neck 101 with post-heating. When post-heating is completed, the preheating burners 42b are extinguished. The drive set 64 is stopped to cease the rotational movement of the lever 62, resulting in stopping the rotation of the annular stand 41 to which the heating means, i.e., the burners 42, is mounted. At the same time, the first up/down means 30 is engaged to reversely rotate the first ball screw 33, allowing the electron gun supporter 31 to descend. The clamping force of the clamp 23b of the bulb supporting means 20 is released, and the completely sealed bulb 100 is removed from the bulb supporting means, completing the sealing operation of the electron gun.

Since the electron gun sealing apparatus according to the present invention is operated by rotating the heating means, i.e., burners, instead of rotating the bulb, misaligned sealing caused by the centrifugal forces applied to the bulb supporting means during the rotation of the bulb as in the conventional apparatus is prevented. Furthermore, it is possible to prevent the sealed portion from being thinned or cracked, by accurate position control and sealing flame adjustment. Moreover, the automatically performed sealing operation makes the sealing operation easy, in addition to reducing labor, and improving productivity.

What is claimed is:

1. An electron gun sealing apparatus for sealing an electron gun in the neck of a bulb for a cathode ray tube comprising:
   a bulb supporting means placed above a frame including a neck position adjuster for supporting a bulb and adjusting and fixing the position of a bulb neck;
   an electron gun supporter disposed below said bulb supporting means;
   a first up/down means for raising and lowering said electron gun supporter, provided vertically below the neck position on adjuster
   a heating means for heating a bulb neck, arranged to surround said electron gun supporter
   a second up/down means for raising and lowering said heating means to a certain height in relation to said electron gun supporter; and
   a revolving means for rotating said heating means around said electron gun supporter.

2. An electron gun sealing apparatus as claimed in claim 1, wherein said neck position adjuster comprising:
   a pair of holding blocks spaced apart from each other by a predetermined distance;
   a guide rail supported by said holding blocks;
   a pair of feed blocks guided by said guide rail, and traveling in opposing directions connected by a lead screw which is rotatably installed to said holding blocks; and
   clamping jaws supported by each feed block.

3. An electron gun sealing apparatus as claimed in claim 1, wherein said first up/down means comprises:
   a first ball screw installed in a frame and rotated by a first servo-motor; and
   a first feed member screw-coupled to said first ball screw, and coupled to the lower end of said electron gun supporter by a coupler.

4. An electron gun sealing apparatus as claimed in claim 1, wherein said heating means comprises:

an annular stand positioned below said bulb supporting means and having a common vertical axis with said bulb supporting means; and a plurality of welding burners and preheating burners alternately installed on said annular stand.

5. An electron gun sealing apparatus as claimed in claim 4 wherein said second up/down means comprises;

a burner support rod coupled to said annular stand at a selected point;

a second ball screw installed in a frame and rotated by a second servo-motor;

a second feed member screw-coupled to said second ball screw which is movable along said second ball screw; and a guide block coupled with said second feed member and said burner support rod; whereby vertical translation of said second feed member causes vertical translation of said annular stand.

6. An electron gun sealing apparatus as claimed in claim 1, wherein said revolving means comprises:

a cam formed on a rotary shaft of a drive set;

a lever, one end of which is in contact with said cam, and the lengthwise center of which is hinge-coupled to a bracket fixed to said frame;

a turnbuckle joining the other end of said lever to a fixing pole which is coupled to said second up/down means.

7. An electron gun sealing apparatus as claimed in claim 6, wherein an elliptical channel is recessed into one side of said cam.

* * * * *